Jan. 13, 1959

G. A. MARSH ET AL 2,869,003

CORROSION RATE METERING SYSTEM

Filed July 25, 1957

INVENTORS
GLENN A. MARSH
BY EDWARD SCHASCHL

Edward H Lang
ATTORNEY

Jan. 13, 1959   G. A. MARSH ET AL   2,869,003
CORROSION RATE METERING SYSTEM
Filed July 25, 1957   2 Sheets-Sheet 2

INVENTORS
GLENN A. MARSH
BY EDWARD SCHASCHL
ATTORNEY

United States Patent Office 2,869,003
Patented Jan. 13, 1959

2,869,003

CORROSION RATE METERING SYSTEM

Glenn A. Marsh and Edward Schaschl, Crystal Lake, Ill., assignors to The Pure Oil Company, Chicago, Ill., a corporation of Ohio Application July 25, 1957, Serial No. 674,164

7 Claims. (Cl. 307—95)

This invention relates to mitigating the corrosion of submarine or subterranean metal structures by means of cathodic protection. It more specifically relates to an apparatus for determining the minimum current necessary to afford protection in a cathodic protection system.

According to this invention, the minimum current density required to effect the cathodic protection of a metallic structure exposed to an electrolytic environment can be rapidly determined by employing an electrical network which comprises a combination of a corrosion testing assembly, which permits the rapid measurement of corrosion rate in relation to the change in electrical resistance of a corroding test specimen, and a network of electrical elements comprising a cathodic protection system which can be employed to apply a direct current of varying intensity from an external source to the corroding test specimen of the corrosion testing assembly.

Almost any metallic surface exposed to soil or water can be cathodically protected from corrosion. In this corrosion-prevention method a voltage, great enough to cause a certain amount of current to flow into the metal structure to be protected and render all parts of the structure cathodic, is applied from an external source to the structure. To evaluate the economics of the cathodic protection system, it is necessary to determine the amount of current necessary to protect the structure. The current flow should be no greater than the minimum amount required for maximum protection, not only from the standpoint of a useless waste of power, but also to avoid excessive destruction of the anode member of the electrical system.

The prior art describes various methods of determining current requirements which use several arbitrary criteria for deciding the adequacy of the applied voltage. These criteria are generally based on experience. Because of the heterogeneous nature of corrosive environments consisting of soil or water, these criteria may or may not be satisfactory, or may result in the use of excessive amounts of energy. It is desirable, therefore, to study the actual corrosion rate of the metallic structure under varying environmental conditions and rapidly determine the corrosion rate as a function of current density.

Accordingly, it is the primary object of this invention to provide an apparatus which will rapidly determine the minimum current density which must be applied to a metallic structure, susceptible to electrolytic corrosion, by means of a cathodic protection system. It is another object of this invention to provide an apparatus for rapidly evaluating and controlling cathodic protection by determining the corrosion rate of a metallic structure exposed to soil or water as a function of applied current density. An additional object of this invention is to investigate the corrosion rate of a cathodically protected metallic structure as a function of current density by measurement of the electrical resistance changes occurring in thin, narrow, foil-like corrosion test specimens prepared from a material of construction similar to or the same as the metallic structure.

These and other objects will become apparent from the following detailed discussion of this invention.

Figure 1 illustrates schematically the application of the instant invention in determining the cathodic protection for an unprotected metal specimen immersed in an aqueous environment.

Figures 2, 3, 4, and 5 show exemplary test assemblies of foil-like metallic strips employed as test elements in the apparatus of this invention for determining the corrosivity of an aqueous or terranean environment.

Although current density has been suggested as a criterion for determining whether or not cathodic protection is adequate, it has been considered unsatisfactory for a number of reasons (Underground Corrosion, Logan, National Bureau of Standards, Circular C 450). According to this invention, however, a simple, effective way has been found for determining the value of the current density necessary for cathodically protecting a metallic structure exposed to a water or soil corrodent.

In U. S. patent application Serial Number 528,032, filed August 12, 1955, there is described a temperature-compensated, corrosion-testing probe which determines corrosion losses during the corrosion of specimens by measurement of resistance changes occurring in the test specimens. In the basic embodiment of the corrosion-testing probe, two test specimens of the metallic material of construction under consideration are disposed within the corrosive environment in a suitable specimen holder which permits the specimens to be serially interconnected. One of the specimens is left unprotected while the other specimen is sheathed with a protective coating, such as a corrosion-resistant plastic, to prevent its corrosion. These specimens are serially connected and form separate resistances in one branch of a conventional electrical bridge network. This combination of resistance elements constitutes the corrosion-testing unit, or probe, of this invention and functions as the sensing element for the complete apparatus. The remainder of the bridge network, which, in its simplest form, consists of a second resistance branch in parallel with the other resistance branch, a metering instrument such as a galvanometer connected across said resistance branches, and a power source, is positioned outside of the corrosive environment at a point which will facilitate the making of observations in the corrosion study. In the second resistance branch, a variable resistance forms the bridge arm opposed to the corrodible specimen exposed to the corrosive environment. Instrumentation which can be used in connection with this corrosion-testing unit include electrical bridge circuits such as described in U. S. patent applications of L. E. Ellison, Serial Number 528,061, now Patent No. 2,830,265, filed August 12, 1955, and Serial Number 631,697, now Patent No. 2,824,293, filed December 31, 1956.

Figure 1:
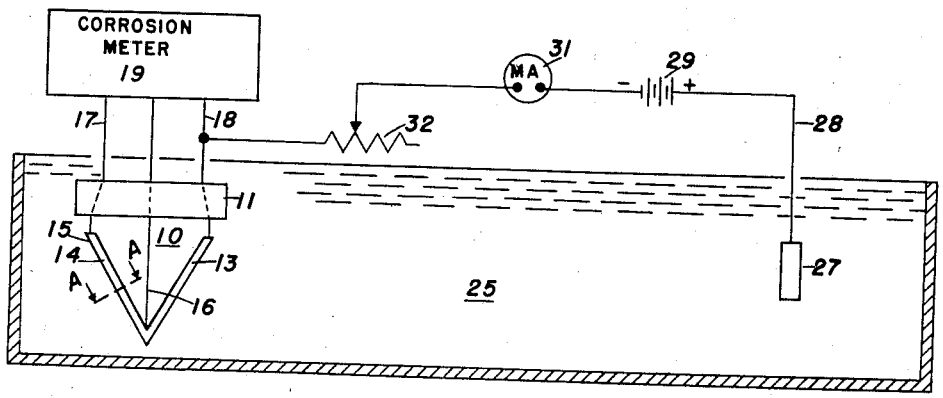
Figure 2:
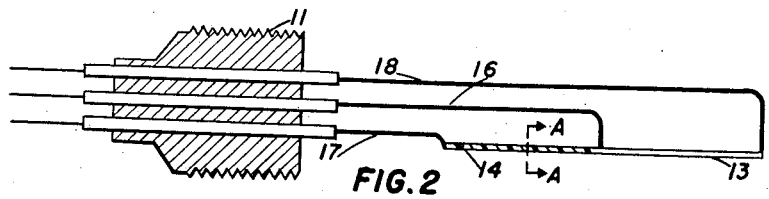
Figure 3:
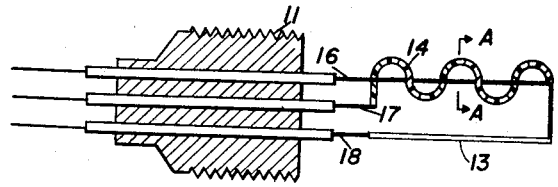
Figure 7:
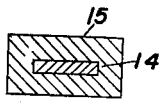
Figure 7 is an enlarged cross section through Line A—A in Figures 2-5, illustrating the ensheathment of the corrosion-resistant element of the test assembly.
Figure 4:
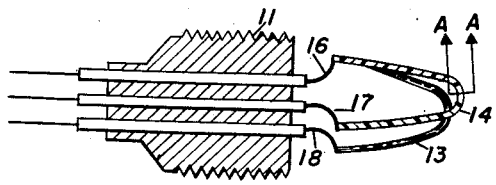

In the apparatus of this invention, a corrosion-testing assembly of this type is electrically connected in series with a variable resistance, an electrical metering device, and a cathodic protection anode which is employed in conjunction with an external source of power or in the form of a sacrificial anode. A more specific embodiment of the test assembly is shown in Figure 1. Corrosion-testing probe element 10 of the apparatus consists of a pair of serially connected test specimens, longitudinally mounted on base member 11, electrically non-conductive. The test specimens, 13 and 14 in this instance, are formed from a replicated, foil-like strip, fabricated from the metallic material of construction used in manufacturing a metallic structure which is to be exposed to the corrosive environment. Section 13 is left bare and unprotected. The other section 14 is ensheathed with corrosion-resistant, protective coating 15 which insulates it from contact with the corrosive environment. This feature provides the temperature-compensating feature of the corrosion-test probe, described in the aforementioned application. At the intermediate junction between sections 13 and 14 there is electrically connected lead 16 which also serves as a support member for retaining the sections substantially co-extensive with the longitudinal axis of base member 11. Lead 16 extends through base member 11. Also traversing base member 11 are electrical leads 17 and 18 which are respectively connected adjacent to the terminal extremities of sections 13 and 14. This probe, which forms one resistance branch of an electrical bridge circuit, is electrically connected to electrical metering network 19, such as a potentiometric null detector or other type of metering circuit calibrated to read directly in corrosion rate units (cf. Ellison applications cited supra).

Test sections 13 and 14 of corrosion-testing probe 10 are disposed within a representative sample of the corrosive soil or aqueous environment 25 in which the metallic structure being studied is placed. Also positioned in the corrosive medium is cathodic protection anode 27. Anode 27 is serially connected externally to probe 10 by means of an electrical circuit between the immersed or buried elements of the apparatus and the current metering section. Also serially connected in this external electrical circuit is a source of D. C. energy, such as battery 29, current metering device 31 and variable resistance 32. This assembly constitutes the basic form of the subject invention.

In employing this apparatus for establishing the relationship between current density and corrosion rate, the corrosion-testing probe element of the apparatus assembly is placed in the environment adjacent the structure to be protected. After a constant, freely-corroding rate is reached as determined by periodic determinations of the resistance of the probe, a measured current is applied and the corrosion rate is again observed. Thereafter, a series of determinations of corrosion rates at different values of applied current is carried out. These data are plotted and, if necessary, extrapolated to establish the minimum current density necessary to provide full cathodic protection of the metallic specimen under consideration. By correlating corrosion rate with current density, a sharp break in the graphical presentation will occur at the point of protection or minimum current density. For a given applied current, with the apparatus of this invention, a corrosion rate can be determined in ½ hour to 8 hours, depending on the magnitude of the corrosion rate. This facilitates obtaining the plurality of corrosion rate-current density relationships necessary to establish the minimum current density required for cathodic protection. The reliability of the apparatus of this invention was established by interrupting the protective current to restore the original corrosion rate. It was found that this rate was substantially identical with the original, freely-corroding rate.

In a typical experiment in which the advantages of the apparatus of this invention are illustrated, a corrosion-testing probe, employing foil-like, cold-rolled steel test sections 3" x 0.125" x 0.001", was used. This probe was prepared in the manner described in U. S. patent application Serial Number 528,032, filed August 12, 1955. See also Oil and Gas Journal, 54 (29), 135 (1955). The freely-corroding rate was determined as often as needed to establish the corrosion rate with an A. C., bridge-type corrosion meter described in U. S. patent application Serial Number 631,697, filed December 12, 1955. This instrument is manufactured and sold by Labline, Inc., Chicago, Illinois, under the mark Corro-Dex, catalogue No. 5205, battery-operated, corrosion meter.

In a typical experiment, the probe was held on a plastic plate in spaced relationship from a carbon rod anode. The anode was six inches long and was spaced six inches from the probe. The probe and anode were immersed in a glass battery jar 12 inches in diameter by 12 inches high. By means of a 1.5 volt dry cell and a 10,000 ohm variable resistor, arranged as shown in in Figure 1, current could be passed through the probe, adjusted over wide limits, and measured with a milliammeter. This assembly permitted the simultaneous measurement of corrosion loss of thickness and cathodic protection current density. The results of an experiment employing a 3% sodium chloride solution containing 2.2 p. p. m. dissolved oxygen are tabulated in Table I:

*Table I*

| Current Density, ma./square foot | Corrosion Rate, $\mu$ inches/hr. |
| --- | --- |
| 0 | 0.42 |
| 2 | 0.34 |
| 5 | 0.23 |
| 10 | 0.04 |
| 11 | 0.00 |

Figure 6:
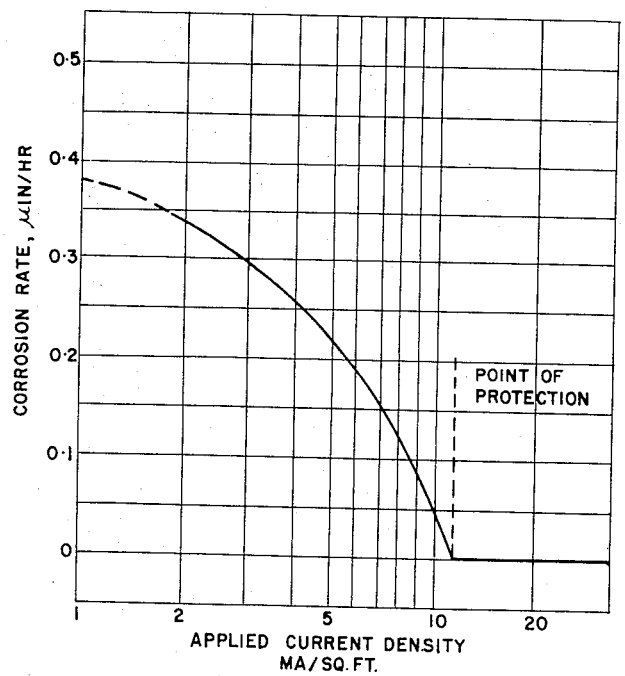
Figure 6 is a graphical presentation of the data obtained in an investigation of the current density vs. corrosion rate relationship for a specific corrosive system, illustrating the point of minimum current density required to effect cathodic protection.

These results are graphically presented in Figure 6. It will be noted that at an applied current density of about 11 milliamperes/square foot a sharp break in the curve occurs indicating that at this point exists the minimum current density which is needed to effect cathodic protection of the metallic structure being studied.

Figure 5:
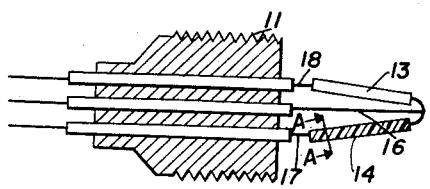

From the foregoing description of the apparatus of this invention and its application to cathodic protection systems, it is evident that modifications can be made in the instant invention by those skilled in the art without departing from the scope of this invention. Because suitable probe construction is not a part of this invention, and is covered comprehensively in copending applications, reference is made to these applications for additional detail. The corrosion-testing probe element of the apparatus can be employed in any of the various designs set forth in U. S. patent application Serial Number 528,032, cited supra. Other probe designs are set forth in U. S. patent applications Serial Numbers 568,906, filed March 1, 1956; 597,368, filed July 12, 1956; 611,-518, filed September 24, 1956; 604,205, filed August 15, 1956; 629,365, filed December 19, 1956; and 629,077, now Patent No. 2,834,858, filed December 18, 1956. It is preferred for the purposes of this invention to use a probe of the type in Figure 5, wherein the exposed element is about ⅛" x 3" x 0.001". This probe has an exposed area of about 0.05 square feet. The corrosion meter used in conjunction with the probe is preferably an A. C. network which produces an A. C. voltage across the corrosion probe. Although procedures employing a direct current can be employed, these are undesirable for a number of reasons. (Vide: Electrical Resistance Corrosion Measurement Employing Alternating Current, Denman, Corrosion, 13, January 1957, page 43T, et seq). Accordingly, apparatus is used such as that described in the Ellison applications, or employed by Denman, cited supra.

Conventional materials of construction are used as the anode member of the apparatus. These include iron, steel, coke, carbon, and platinum. Preferably carbon or platinum anodes are used. The anode may be any size or shape consistent with the dimensions of the test area. A sacrificial anode such as magnesium or zinc can be used. The use of sacrificial anodes as a means for impressing an applied voltage to the metallic structure whose corrosion rate is being studied, while having utility as a source of power, is less efficient and sensitive than the use of an external power supply hereinafter discussed. If a sacrificial anode is used, the current density can be varied by changing the distance between the anode and the cathodic element of the system. In the alternative, a voltage-dropping variable resistor positioned in series in the external section of the circuit can be employed. A metering device is provided which will measure the variations in current density produced. If a non-sacrificial anode is applied to the probe, current can be provided by primary or secondary cells. If desired, conventional rectifiers such as vacuum tubes, crystal diodes, or other similar electrical networks can also be used. (Vide: Radio Amateurs Handbook, American Radio Relay League.) The selected direct current power source should be sufficient to supply a range of current densities of from 0 to 30 ma./square foot. To measure the current flowing in the apparatus during the test, conventional test instruments can be used. It is preferred that a sensitive meter such as an 0–2 milliammeter be used. Other meters which can be employed include a sensitive VTVM in which the voltage drop across a resistance is used to measure the current.

Figure 8:
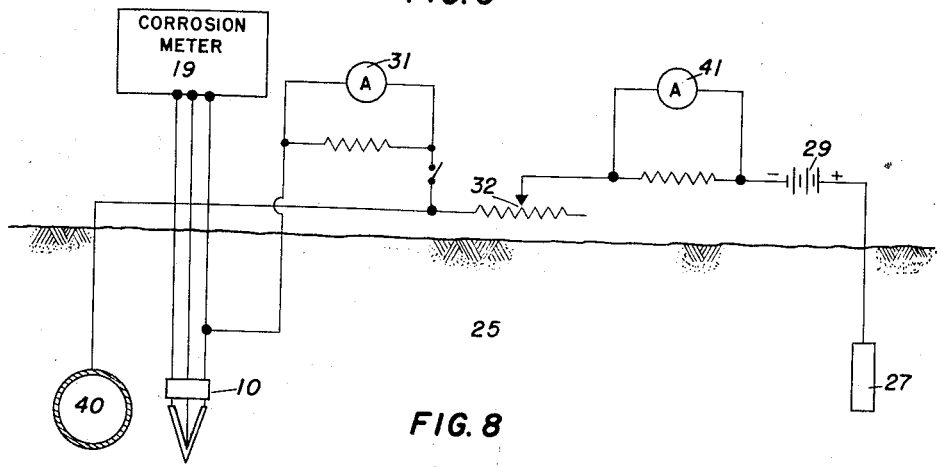
Figure 8 is an example of an installation employing the apparatus of this invention for determining the corrosion rate-current density relationship for a buried metallic structure.

Although the foregoing discussion of the apparatus of this invention is directed primarily to laboratory investigations, the device can be used in the field to make appropriate corrosion rate studies. In this instance the cathodic protection system being employed is modified to permit the installation of the corrosion test assembly in series in the system circuit and means are provided for varying the intensity of the applied current and measuring the current flow in the system. An illustrative installation of this nature is shown schematically in Figure 8 wherein an existing cathodic protection system, comprising uried metallic structure 40, external source of D. C. power 29, ammeter 41, and anode 27, is modified by installing a suitable probe assembly 10 intermediate the anode 27 and cathode 40 elements of the system which is interconnected to detecting and metering network 19, and providing a means, e. g., variable resistor 32, for varying the intensity of the current density. Ammeter 31 is employed for measuring the current flow in probe 10 while ammeter 41 measures the current applied to structure 40.

From the foregoing detailed description of this invention, it is evident that the subject apparatus is especially adaptable for use in determining the minimum current density required to effect the cathodic protection of a metallic structure enveloped by a soil or water corrosive environment. This apparatus accomplishes this objective by facilitating an evaluation of the current density-corrosion rate relationship of a cathodically protected metallic structure.

Accordingly, we claim as our invention:

1. An apparatus for investigating the current density-corrosion rate relationship to determine the minimum current density required for maximum efficiency in a cathodically-protected, metallic structure exposed to an electrolytic environment which comprises a specimen holder for retaining a pair of metallic specimens in contact with the corrosive environment, said specimens being substantially identical in composition with the metallic structure and comprising a corrosion-resistant metallic specimen serially connected to a corrosion-susceptible metallic specimen and providing an intermediate junction, said corrosion-resistant specimen being ensheathed with a protective, corrosion-resistant covering; a plurality of electrical conductors electrically insulated each from the other, comprising a first electrical conductor electrically connected to one terminal extremity of said pair of specimens, a second electrical conductor connected to the other terminal extremity of said pair of specimens, and a third electrical conductor connected to said intermediate junction formed by said pair of specimens; means for measuring the corrosion rate of said unprotected specimen electrically connected to said specimens whereby changes in the resistance of said corrosion-susceptible specimen resulting from the corrosion thereof is correlated with corrosion rate of said specimen; and a cathodic protection circuit electrically connected serially to one of said conductors comprising a source of direct current power, means for varying the intensity of the current flow from said power source, whereby a variable current density can be applied to said unprotected specimen, a means for metering the flow of current in said cathodic protection circuit and means for connecting said power source, said means for varying the intensity of current flow and said meter means in series with one of said conductors.

2. An apparatus for investigating the current density-corrosion rate relationship to determine the minimum current density required for maximum efficiency in a cathodically-protected, metallic structure exposed to an electrolytic environment which comprises a specimen holder for retaining a pair of metallic specimens in contact with the corrosive environment, said specimens being substantially identical in composition with the metallic structure and comprising a corrosion-resistant metallic specimen serially connected to a cororsion-susceptible metallic specimen and providing an intermediate junction, said corrosion-resistant specimen being ensheathed with a protective, corrosion-resistant covering; a plurality of electrical conductors electrically insulated each from the other, comprising a first electrical conductor electrically connected to one terminal extremity of said pair of specimens, a second electrical conductor connected to the other terminal extremity of said pair of specimens, and a third electrical conductor connected to the said intermediate junction formed by said pair of specimens; means for measuring the corrosion rate of said unprotected specimen electrically connected to said specimens whereby changes in the resistance of said corrosion-susceptible specimen resulting from the corrosion thereof is correlated with corrosion rate of said specimen; and a cathodic protection circuit comprising a sacrificial anode electrically connected to one of said conductors whereby a direct current can be passed through said electrolytic environment and impressed upon said corrosion-susceptible metallic specimen, means for varying the intensity of the current flow from said sacrificial anode, whereby a variable current density can be applied to said unprotected specimen, and a means for metering the flow of current in said protection circuit electrically connected to said sacrificial anode.

3. An apparatus for investigating the current density-corrosion rate relationship to determine the minimum current density required for maximum efficiency in a cathodically-protected, metallic structure exposed to an electrolytic environment which comprises a specimen holder for retaining a pair of metallic specimens in contact with the corrosive environment, said specimens being substantially identical in composition with the metallic structure and comprising a corrosion-resistant metallic specimen serially connected to a corrosion-susceptible metallic specimen and providing an intermediate junction, said corrosion-resistant specimen being ensheathed with a protective, corrosion-resistant covering; a plurality of electrical conductors electrically insulated each from the other, comprising first electrical conductor electrically connected to one terminal extremity of said pair of specimens, a second electrical conductor connected to the other terminal extremity of said pair of specimens, and a third electrical conductor connected to the said intermediate junction formed by said pair of specimens; means for measuring the corrosion rate of said unprotected specimen electrically connected to said specimens whereby changes in the resistance of said corrosion-susceptible specimen resulting from the corrosion thereof is correlated with corrosion rate of said specimen; and a cathodic protection circuit comprising a source of direct current, and an anode member electrically connected to said source of direct current and one of said conductors whereby a direct current can be passed through said electrolytic environment and impressed upon said corrosion-susceptible metallic specimen, means for varying the intensity of the current flow from said power source, whereby a variable current density can be applied to said unprotected specimen, and a means for metering the flow of current in said protection circuit electrically connected to said anode.

4. An apparatus for investigating the current density-corrosion rate relationship to determine the minimum current density required for maximum efficiency in a cathodically-protected, metallic structure exposed to an electrolytic environment which comprises a specimen holder for retaining a pair of metallic specimens in contact with the corrosive environment, said specimens being substantially identical in composition with the metallic structure and comprising a foil-like corrosion-resistant metallic specimen serially connected to a foil-like corrosion-susceptible metallic specimen and providing an intermediate junction, said corrosion-resistant specimen being ensheathed with a protective, corrosion-resistant covering; a plurality of electrical conductors electrically insulated each from the other, comprising a first electrical conductor electrically connected to one terminal extremity of said pair of specimens, a second electrical conductor connected to the other terminal extremity of said pair of specimens, and a third electrical conductor connected to said intermediate junction formed by said pair of specimens; means for measuring the corrosion rate of said unprotected specimen electrically connected to said specimens whereby changes in the resistance of said corrosion-susceptible specimen resulting from the corrosion thereof is correlated with corrosion rate of said specimen; and a cathodic protection circuit comprising a source of direct current, an anode member electrically connected to said source of direct current and one of said conductors whereby a direct current can be passed through said electrolytic environment and impressed upon said corrosion-susceptible metallic specimen, means for varying the intensity of the current flow from said power source whereby a variable current density can be applied to said unprotected specimen, and a means for metering the flow of current in said external circuit electrically connected to said anode.

5. A apparatus for investigating the current density-corrosion rate relationship to determine the minimum current density required for maximum efficiency in a cathodically-protected, metallic structure exposed to an electrolytic environment which comprises a specimen holder for retaining a pair of metallic specimens in contact with the corrosive environment, said specimens being substantially identical in composition with the metallic structure and comprising a foil-like corrosion-resistant metallic specimen serially connected to a foil-like corrosion susceptible metallic specimen and providing an intermediate junction, said corrosion resistant specimen being ensheathed with a protective, corrosion-resistant covering; a plurality of electrical conductors electrically insulated each from the other, comprising a first electrical conductor electrically connected to one terminal extremity of said pair of specimens, a second electrical conductor connected to the other terminal extremity of said pair of specimens, and a third electrical conductor connected to said intermediate junction formed by said pair of specimens; means for measuring the corrosion rate of said unprotected specimen electrically connected to said specimens whereby changes in the resistance of said corrosion-susceptible specimen resulting from the corrosion thereof is correlated with corrosion rate of said specimen; and a cathodic protection circuit a source of direct current having sufficient capacity to impress a current density up to about 30 milliamperes—square foot on said unprotected specimen, a variable resistor for varying the intensity of said current density, an ammeter, and an anode member electrically connected in series to one of said conductors whereby a direct current can be passed through said electrolytic environment and impressed upon said corrosion-susceptible metallic specimen.

6. An apparatus for determining current density-corrosion rate relationships to measure minimum current density required for maximum cathodic protection of a metallic structure exposed to a corrosive atmosphere which comprises, in combination, a corrosion test probe including a base element, three electrical conductors extending through said base element in insulated relationship, a single strip metallic coupon resistance element connected at its ends between two of said electrical conductors, said third conductor being connected to a common juncture on said resistance element dividing same into two portions, means for protecting one of said portions from said corrosive atmosphere, said remaining portion being unprotected, means connected to said conductors for measuring the corrosion rate of said unprotected portion of said resistance element, a cathodic protection circuit electrically connected serially to one of said conductors comprising a source of direct current power, means for varying the intensity of the current flow from said power source, whereby a variable current density can be applied to said unprotected portion of said resistance element, means for metering the flow of current in said cathodic protection circuit and means for connecting said power source, said means for varying the intensity of current flow and said meter means in series with one of said conductors.

7. An apparatus for determining current density-corrosion rate relationship to measure minimum current density required for maximum cathodic protection of a metallic structure exposed to a corrosive atmosphere which comprises, in combination, a corrosion test probe including a base element, three electrical conductors extending through said base element in insulated relationship, a single strip metallic coupon resistance element connected at its ends between two of said electrical conductors, said third conductor being connected to a common juncture on said resistance element dividing same into two portions, means for protecting one of said portions from said corrosive atmosphere, said remaining portion being unprotected, means connected to said conductors for measuring the corrosion rate of said unprotected portion of said resistance element, a cathodic protection circuit electrically connected serially to said conductor connected to said corrodible portion of said resistance element comprising, a source of direct current power, means for varying the intensity of the current flow from said power source, whereby a variable current density can be applied to said unprotected portion of said resistance element, means for metering the flow of current in said cathodic protection circuit and means for connecting said power source, said means for varying the intensity of current flow and said meter means in series with one of said conductors.

No references cited.